United States Patent [19]

Yamanaka et al.

[11] Patent Number: 4,801,433
[45] Date of Patent: Jan. 31, 1989

[54] APPARATUS FOR REACTION INCLUDING HORIZONTAL-TYPE REACTOR AND LIQUID CIRCULATOR

[75] Inventors: Katsuhisa Yamanaka; Tokinobu Furukawa; Hirohiko Shindoh; Yukio Kaneyuki; Takatoshi Kinoshita; Masahiko Ishibe, all of Kudamatsu-shi, Japan

[73] Assignee: Hitachi, Ltd., Tokyo, Japan

[21] Appl. No.: 841,831

[22] Filed: Mar. 20, 1986

[30] Foreign Application Priority Data

Mar. 29, 1985 [JP] Japan ................................. 60-63615

[51] Int. Cl.$^4$ ............................................. B01F 7/04
[52] U.S. Cl. ................................. 422/228; 422/137; 422/135; 422/229; 422/234; 422/236; 422/110; 366/137; 366/291; 366/299
[58] Field of Search ............... 422/137, 110, 227, 229, 422/132, 135, 228, 234, 239, 236; 366/136, 137, 159, 290, 291, 297, 299

[56] References Cited

U.S. PATENT DOCUMENTS

| | | | |
|---|---|---|---|
| 1,916,885 | 7/1933 | Kirschbraun | 366/291 |
| 2,924,591 | 2/1960 | Roelen | 422/135 |
| 2,984,657 | 5/1961 | Grundmann et al. | 422/135 |
| 3,242,150 | 3/1966 | Scoggin | 422/132 |
| 3,524,730 | 8/1970 | Yokouchi et al. | 422/137 |
| 3,536,300 | 10/1970 | Ainsworth et al. | 366/291 |

FOREIGN PATENT DOCUMENTS

| | | |
|---|---|---|
| 0016393 | 4/1981 | European Pat. Off. . |
| 1545043 | 2/1970 | Fed. Rep. of Germany . |
| 0049231 | 3/1984 | Japan ................................. 422/137 |

Primary Examiner—Benoit Castel
Attorney, Agent, or Firm—Antonelli, Terry & Wands

[57] ABSTRACT

An apparatus for reaction according to the present invention includes a horizontal-type reactor having first and second portions and a liquid circulator for circulatorily feeding a liquid from the first portion of the reactor, through the second portion of the reactor which is spaced apart from the first portion of the reactor in the direction of axis of the reactor. The reactor includes stirring blades on a stirring shaft whereby the liquid can be stirred in the rotational directions of the stirring blades of the horizontal-type reactor, while it is stirred in the axial direction thereof by the liquid circulator, thereby enabling the liquid to be stirred uniformly throughout the interior of the reacting apparatus without damaging surface renewal effects on a vapor-liquid interface.

11 Claims, 4 Drawing Sheets

APPARATUS FOR REACTION INCLUDING HORIZONTAL-TYPE REACTOR AND LIQUID CIRCULATOR

BACKGROUND OF THE INVENTION

1. Field of the Invention

The present invention relates to an apparatus for reaction which is employed in the production of viscous liquid. More particularly, it pertains to an apparatus for reaction which is suitable for use in reacting and mixing one type of viscous liquid with one or more other types of viscous liquid or with an added liquid.

2. DESCRIPTION OF THE PRIOR ART

Heretofore, a vertical-type reactor or a horizontal-type reactor has been employed for the production of viscous liquid. A vertical-type reactor of the type shown in FIG. 10, however, involves the following disadvantages when it is used for treating a viscous liquid. Because the vertical-type reactor 1 employs ribbon-shaped blades or anchor blades as a stirring blade 2 such as to stir the viscous liquid as shown in FIG. 10, (1) when a substance contained in a reactor becomes highly viscous (so as to have a viscosity of 10,000 P or over, for example), the substance becomes attached to the stirring blades 2, turns around together with the blades, and is not circulated in a vertical direction efficiently within the reactor. In consequence, effective stirring of the substance is prevented, resulting in the substance having an uneven composition. (2) If the substance is not circulated efficiently within the reactor, surface renewal does not take place sufficiently on a vapor-liquid interface, and effective deaeration is prevented even when it is required in a reaction.

On the other hand, a horizontal-type reactor 3 as shown in FIGS. 11 and 12 realizes more effective treatment of a viscous liquid, and can treat the sort of liquid that would not be dealt with by a vertical-type reactor 1. The treatment effected by the horizontal-type reactor 3 is specifically effective in terms of the stirring action (in a vertical direction, in this case) and the surface renewal effects. In a horizontal-type reactor 3, however, the horizontal length of the reactor is greater than its height, and the substance cannot be stirred effectively in the direction in which the stirring shafts extend.

SUMMARY OF THE INVENTION

Accordingly, it is an object of the present invention to provide an apparatus for reaction which is capable of blending a viscous liquid effectively and of stirring it uniformly throughout the interior of the apparatus.

To this end, according to the present invention, the arrangement is such that a horizontal-type reactor includes a first portion and a second portion which is spaced apart from the first portion in the direction of the axis of the reactor and that a liquid circulator has a liquid feeder, a first portion and a second portion which is spaced apart from the first portion in the direction of the axis of the liquid circulator, wherein the second portion of the liquid circulator is coupled to the second portion of the horizontal-type reactor through a change-over valve, while the first portion of the liquid circulator is coupled to the first portion of the horizontal-type reactor, whereby a liquid is adapted to flow into the liquid circulator from the first portion of the horizontal-type reactor and is circulatorily fed to the second portion of the horizontal-type reactor by switching the change-over valve to the horizontal-type reactor, thereby stirring the liquid in the rotational directions of the stirring blades of the horizontal-type reactor as well as in the axial direction by the liquid circulator such as to achieve a uniform stirring of the liquid throughout the interior of the apparatus.

DESCRIPTION OF THE PREFERRED EMBODIMENTS

Figure 1:
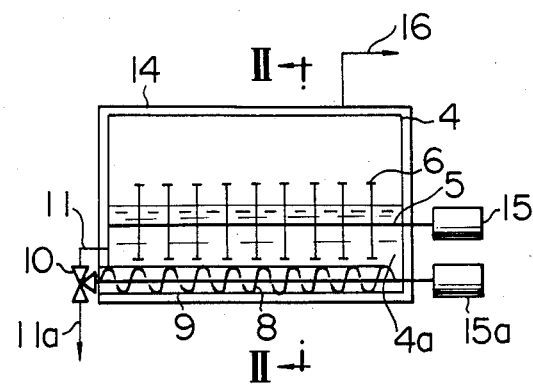
FIG. 1 is a vertical sectional front view of a first embodiment of a reacting apparatus according to the present invention.
Figure 2:
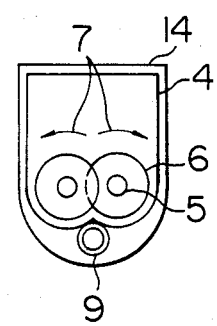
FIG. 2 is a section taken along the line II—II of FIG. 1.
Figure 3:
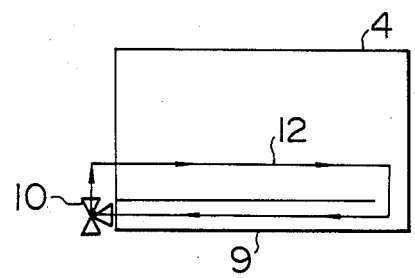
FIG. 3 schematically shows the flow of the liquid contained in the apparatus when it is batch processed.

Embodiments of the present invention will be described hereinafter with reference to the accompanying drawings. Referring first to FIGS. 1 to 6 which show a first embodiment of the invention, reference numeral 4 denotes a horizontal-type reactor including therein stirring shafts 5 and stirring blades 6. A heating jacket 14 is provided on the outer periphery of the reactor. The blades are at least two in number and are each shaped in a disc-like or other special form which ensures effective stirring of a substance in its rotational direction, are mounted on the shafts 5, and are driven by a driving device 15 such as to rotate in the respective directions shown by arrows 7 in the drawings. Reference numeral 9 designates a cylindrical liquid circulator provided at the lower portion of the reactor 4. Portions of the liquid circulator 9 and the horizontal reactor 4 are separated by a boundary wall extending in the longitudinal direction. The liquid circulator 9 internally incorporates a liquid feeder 8 such as a screw driven by a driving device 15a. A second end of the circulator 9 is coupled to an inlet side of the horizontal-type reactor 4 which is located at a second end thereof through a change-over valve 10 and a conduit 11. A first end of the circulator 9 is coupled to an outlet 4a of the reactor 4 which is located at a first end thereof. Reference numeral 16 indicates a conduit which communicates the upper portion of the interior of the reactor 4 with a vacuum regulator (not shown) including a condenser, an evacuator and so forth.

In an apparatus arranged in the above-described manner, when the change-over valve 10 is switched to the conduit 11, the liquid contained in the apparatus which is stirred by the blades 6 in their rotational directions, and is undergoing surface renewal is extracted into the circulator 9 from the outlet 4a while being stirred, is conveyed by the liquid feeder 8, and is fed to the inlet side of the reactor 4 through the change-over valve 10 and the conduit 11. At this time, the liquid completes a cycle of circulation by flowing along the path shown by the arrow 12 in FIG. 3. Thus, the liquid contained in the apparatus and circulated by means of the circulator 9 can be stirred in the horizontal direction, making it possible for the resultant products to possess an even more uniform quality. After the above-described circulation of the liquid has been repeated and a predetermined reaction is completed, the change-over valve 10 is switched to the conduit 11a, and the product can be discharged from the system through the circulator 9 which now serves as an extractor. In addition, volatile matter created within the reactor 4 is discharged through the conduit 16.

When the change-over valve 10 is switched to the conduit 11a, a raw liquid can also be supplied to the inlet side of the horizontal-type reactor 4 which is located at one end thereof through a raw liquid supply line (not shown). The thus-supplied raw liquid is stirred by the blades 6 in the rotational directions thereof, repeating surface renewal, is extracted into the circulator 9 from the outlet 4a while being stirred, and is stirred and conveyed by the feeder 8 within the circulator 9 before being continuously discharged from the system as a final product through the change-over valve 10 and the conduit 11a.

In the above-described embodiment, the circulator 9 incorporates the feeder 8. However, the circulator may also be constructed by connecting a gear-pump to the reactor through a piping. In this way, a liquid can be circulated in the same manner as in the above case but with a simpler structure.

Figure 4:
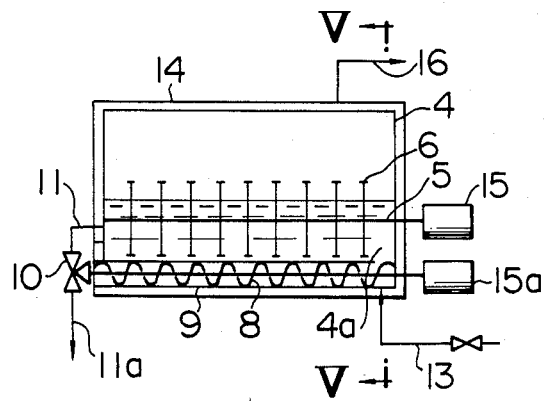
FIG. 4 is a vertical sectional front view of the first embodiment of the reacting apparatus according to the present invention.
Figure 5:
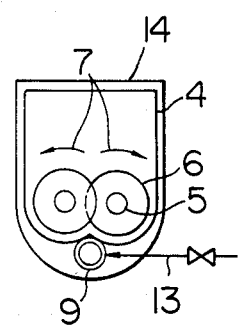
FIG. 5 is a section taken along the line V—V of FIG. 4.

FIGS. 4 and 5 show the apparatus in the state wherein a line 13 for supplying an added liquid is connected to the first end of the circulator 9. When the added liquid is supplied in the liquid contained in the apparatus, it is fed into the circulator 9 through the supply line 13 and is preliminarily blended with the liquid contained within the circulator 9 before it is fed into the reactor 4, thereby enabling the liquid added to be effectively blended. In addition, if the raw liquid supply line (not shown) is connected to the first end of the circulator 9, the remainder of the product which is left within the reactor 4 and the ciculator 9 can be cleaned by the supplied raw liquid after the products are discharged from the reactor 4, whereby product yield may be increased.

Figure 6:
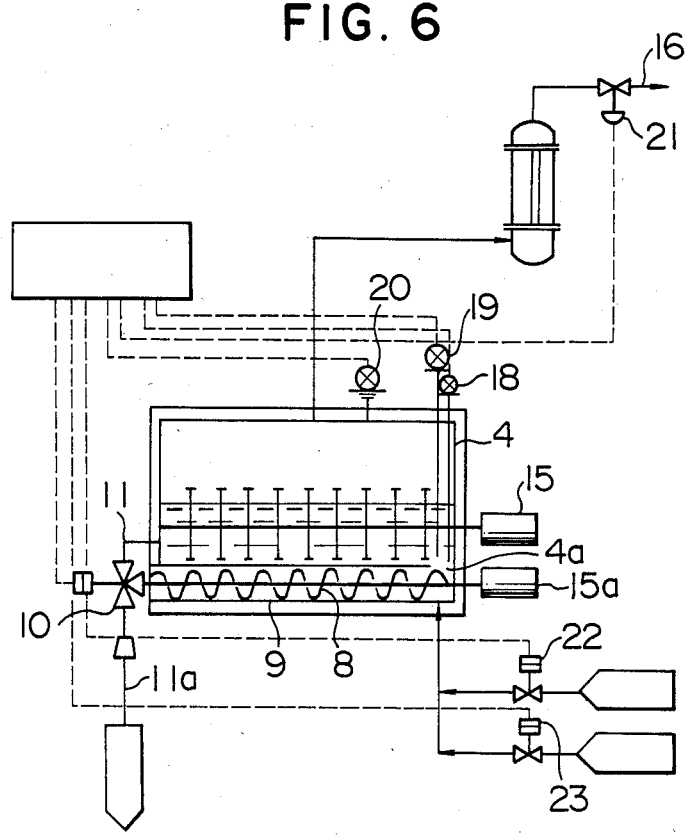
FIG. 6 is a system diagram of an automatic operation conducted when the liquid is batch processed, shown as an example.

As for the automatic operation of the apparatus which will be described hereinafter with reference to FIG. 6, when a raw liquid feed valve 22 is opened and the circulator 9 is started, the raw liquid is supplied to the reactor 4 from the circulator 9 through the change-over valve 10 and the conduit 11, so that it is stirred and circulated by driving the blades 6 and the evacuator (not shown). The level of the raw liquid supplied to the reactor 4 is detected by a level gage 18. The raw liquid feed valve 22 is closed when a predetermined amount of liquid has been fed. Then, the reaction of the liquid proceeds in this state. A viscometer 19 detects whether or not the viscosity of the liquid has reached a predetermined value. When end point viscosity of the liquid is detected by the viscometer 19, the change-over valve 10 is switched to the conduit 11a, and the product is discharged. The viscosity of the product is maintained constant during discharge by controlling a vacuum regulator valve 21. The end point of the product discharge is detected by the level gage 18. When the gage 18 detects that the level of the liquid has been lowered below a predetermined level, the change-over valve 10 is switched to the conduit 11, and the raw liquid feed valve 22 is opened so that the next batch of liquid may be reacted.

In the above-mentioned embodiment, operation of the apparatus was focused on the supply of a raw liquid. It is to be understood, however, that a raw liquid and an added liquid may together, or separately, be supplied in the same manner as the raw liquid alone is in the above-mentioned embodiment.

Figure 7:
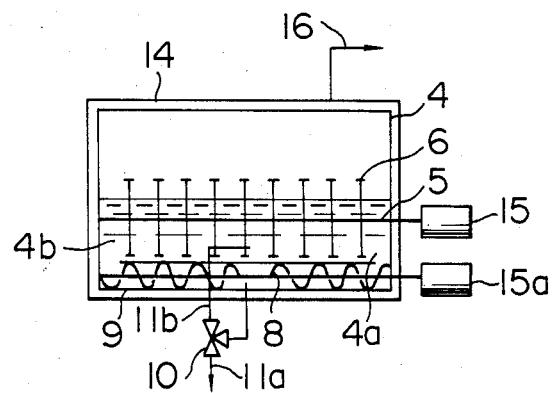
FIG. 7 is a front view of a second embodiment of the reacting apparatus according to the present invention.
Figure 8:
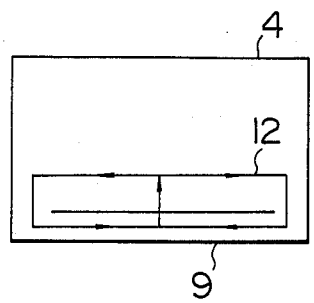
FIG. 8 shows the flow of the liquid contained in the apparatus when it is batch processed.

A second embodiment of the present invention will be described hereinafter with reference to FIGS. 7 to 9. Since like reference numerals designate like parts throughout FIGS. 1 to 9, their explanations will be omitted here. Each end of the circulator 9 is connected to outlets 4a, 4b of the reactor 4 provided at respective ends thereof, respectively. The central portion of the circulator 9 is connected to the central portion of the reacter 4 through the change-over valve 10 and the conduit 11b. A liquid is fed by the liquid feeder 8 toward the central portion of the circulator 9 from each side thereof.

With the above-described arrangement, a liquid contained in the reactor 4 is stirred by the blades 6 in their rotational directions, while renewing the vapor-liquid interface. The liquid is then extracted into the circulator 9 from the outlets 4a, 4b of the reactor 4, is conveyed to the central portion of the circulator 9 by the liquid feeder 8, and is fed to the central portion of the reactor 4 through the change-over valve 10 and the conduit 11b. Thus, the liquid contained in the reactor completes a cycle of circulation by flowing along the path shown by the arrow 12 in FIG. 8. In this method, the liquid is circulated in the apparatus in the lengthwise direction of the stirring shafts 5, flowing in two different directions. Therefore, it is also stirred in the axial direction of the apparatus as effectively as it is in the rotational directions of the blades. In addition, since the liquid is circulated by the circulator 9, it is also stirred and blended within the circulator 9 and the conduit 11b. The circulation of the liquid is divided in two streams at the central portion of the reactor 4. This can shorten the number of days required for circulation, and make the quality of the final products more uniform.

After the above-described circulation of the liquid is repeated and a predetermined reaction is completed, the resulting product can be discharged from the system through the circulator 9 which serves this time as an extractor by switching the change-over valve 10 to the conduit 11a.

Figure 9:
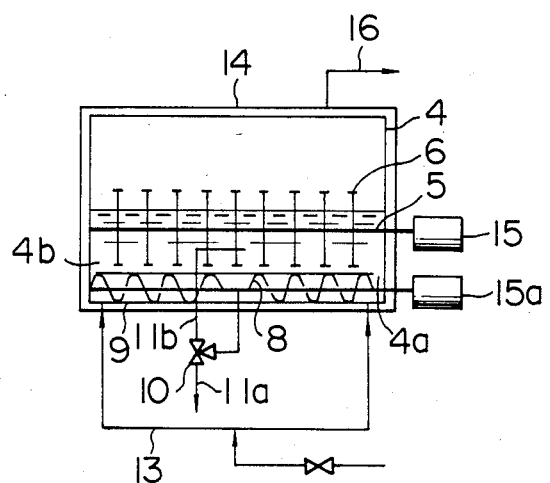
FIG. 9 is a front view of the second embodiment of the reacting apparatus according to the present invention.
Figure 10:
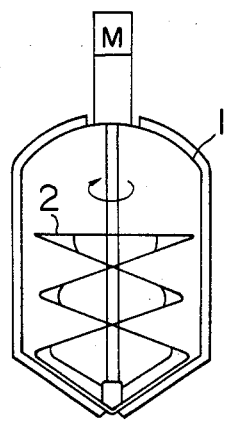
FIG. 10 is a front view of a conventional vertical-type reactor.
Figure 11:
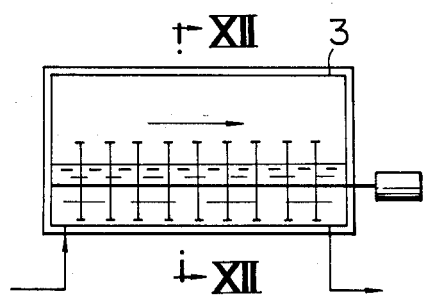
FIG. 11 is a front view of a conventional horizontal-type reactor.
Figure 12:
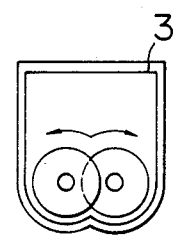
FIG. 12 is a section taken along the line XII—XII of FIG. 11.

FIG. 9 shows the apparatus in the state wherein the supply line 13 of an added liquid is connected to each end of the circulator 9. When an added liquid is added to the liquid which is being reacted in the reactor, it is fed to each end of the circulator 9 from the supply line 13, and is preliminarily mixed with the liquid contained within the circulator 9 while being conveyed to the central portion of the circulator 9, before it is supplied in the reactor 4. Therefore, an added liquid can be blended more effectively.

When a viscous liquid is reacted according to the present invention, it is stirred not only in the rotational directions of the blades in the reactor but even in the axial direction by the circulator, thereby enabling the liquid to be stirred uniformly throughout the interior of the apparatus.

What is claimed is:

1. An apparatus for reaction comprising a horizontal reactor and a liquid circulator,
    said horizontal reactor extending in a longitudinal direction, and having at least one stirring shaft, said at least one stirring shaft having an axis extending in said longitudinal direction, and a plurality of stirring blades for stirring liquid in a rotational direction mounted on said at least one stirring shaft, wherein said horizontal reactor has a first portion and a second portion and wherein said second portion of said horizontal reactor is spaced from said first portion of said horizontal reactor in said longitudinal direction;
    a liquid circulator, including a liquid feeder, for conveying liquid in an axial direction, having a shaft, said shaft of said liquid circulator extending in said longitudinal direction, said liquid circulator including a first portion and a second portion, wherein said second portion of said liquid circulator is spaced from said first portion of said liquid circulator in said longitudinal direction;
    a boundary wall extending in said longitudinal direction separating a portion of said horizontal reactor from a portion of said liquid circulator, said horizontal reactor and said liquid circulator being disposed in a single reactor body;
    a change-over valve including means for fluidly coupling said second portion of said liquid circulator with said second portion of said horizontal reactor; and
    means for discharging a product from said apparatus,
    wherein said first portion of said liquid circulator is in flow communication with said first portion of said horizontal reactor,
    whereby liquid fed into the apparatus is stirred in a rotational direction by said plurality of stirring blades and is stirred in an axial direction by the liquid circulator to thereby achieve a uniform stirring of the liquid in the apparatus.

2. An apparatus for reaction according to claim 1, wherein said liquid circulator is mounted at a lower portion of said horizontal reactor.

3. An apparatus for reaction according to claim 1, wherein said liquid circulator is in a cylindrical form and said liquid feeder comprises a screw.

4. An apparatus for reaction according to claim 3, wherein said stirring blades have a circulator plate form, and wherein said horizontal reactor has at least two stirring shafts.

5. An apparatus for reaction according to claim 1, wherein said liquid feeder includes means for supplying a liquid material to said apparatus for reaction coupled to said first portion of said liquid circulator.

6. An apparatus for reaction according to claim 1, wherein said horizontal reactor has at least two stirring shafts.

7. An apparatus for reaction comprising:
    a horizontal reactor having a longitudinal direction, at least one stirring shaft having an axis extending in said longitudinal direction, and a plurality of stirring blades for stirring liquid in a rotational direction mounted on said at least one stirring shaft, wherein said horizontal reactor has a first portion, a center portion, and a second portion, and wherein said first portion of said horizontal reactor is spaced from said second portion of said horizontal reactor in said longitudinal direction and said center portion of said horizontal reactor is between said first portion of said horizontal reactor and said second portion of said horizontal reactor;
    a liquid circulator, including a liquid feeder, for conveying liquid in an axial direction, having a shaft, said shaft having an axis extending in said longitudinal direction, said liquid circulator further including a first portion, a center portion and a second portion, wherein said first portion of said liquid circulator is spaced from said second portion of said liquid circulator in said longitudinal direction and said center portion of said liquid circulator is between said first portion of said liquid circulator and said second portion of said liquid circulator;
    a boundary wall extending in said longitudinal direction separating a portion of said horizontal reactor from a portion of said liquid circulator, said horizontal reactor and said liquid circulator being disposed in a single reactor body;
    a change-over valve including means fluidly coupling said center portion of said liquid circulator with said center portion of said horizontal reactor; and
    means for discharging a product from said apparatus,
    wherein said first portion of said liquid circulator is in flow communication with said first portion of said horizontal reactor and said second portion of said liquid circulator is in flow communication with said second portion of said horizontal reactor,
    whereby liquid fed into the apparatus is stirred in a rotational direction by said plurality of stirring blades and is stirred in an axial direction by the liquid circulator to thereby achieve a uniform stirring of the liquid in the apparatus.

8. An apparatus for reaction according to claim 7, wherein said liquid feeder includes means for supplying a liquid material to said apparatus for reaction coupled with said first and second portions of said liquid circulator.

9. An apparatus for reaction according to claim 7, wherein said horizontal reactor has at least two stirring shafts.

10. An apparatus for reaction according to claim 7, wherein said liquid circulator is in a cylindrical form and said liquid feeder comprises a screw.

11. An apparatus for reaction according to claim 7, wherein said liquid circulator is mounted beneath said horizontal reactor.

* * * * *